Fig. 4

| PROGRAM STEP | CELL N° | PROGRAMMING INPUTS | | CELL STATUS AFTER PROGRAMMING | |
|---|---|---|---|---|---|
| | | $X_P$ | $Y_P$ | INPUT ON | OUTPUT ON |
| 1 | CB1 | $X_{PB}$ | $Y_{P1}$ | $Z_L$ OF CB1 | O1 OF CB1 |
| 2 | CC2 | $X_{PC}$ | $Y_{P2}$ | $Y_{12}$ | O2 OF CC2 |
| 3 | CA3 | $Z_L$ OF CB1 | $Y_{12}$ | FCR OF CA3 | |
| 4 | CB3 | $X_{PB}$ | $Y_{12}$ | " | " CB3 |
| 5 | CC3 | $X_{PC}$ | $Y_{12}$ | " | " CC3 |
| 6 | CA2 | $Z_L$ OF CB1 | $Y_{P2}$ | " | " CA2 |
| 7 | CA1 | $Z_L$ OF CB1 | $Y_{P1}$ | " | " CA1 |
| 8 | CB2 | $X_{PB}$ | $Y_{P2}$ | " | " CB2 |
| 9 | CB1 | $X_{PB}$ | $Y_{P1}$ | " | " CB1 |
| 10 | CC2 | $X_{PC}$ | $Y_{P2}$ | " | " CC2 |
| 11 | CC1 | $X_{P1}$ | $Y_{P1}$ | " | " CC1 |

Fig. 6

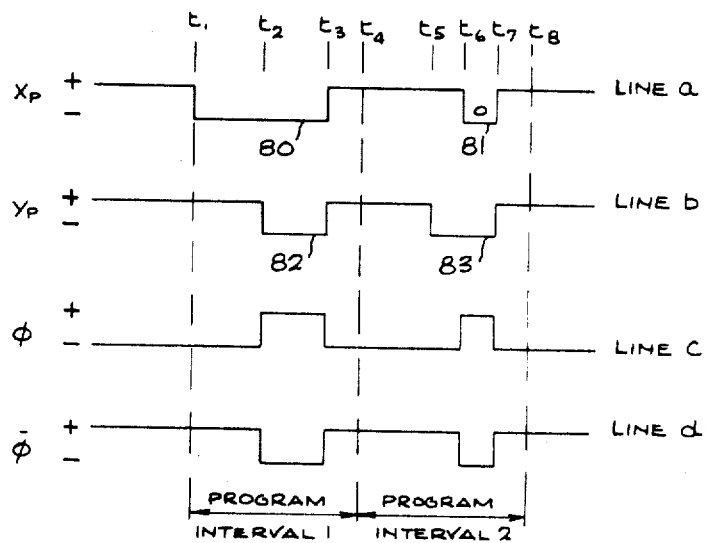

INVENTOR
SVEN ERIK WAHLSTROM
BY Samuel Lindenberg
Abraham Wasserman
ATTORNEYS

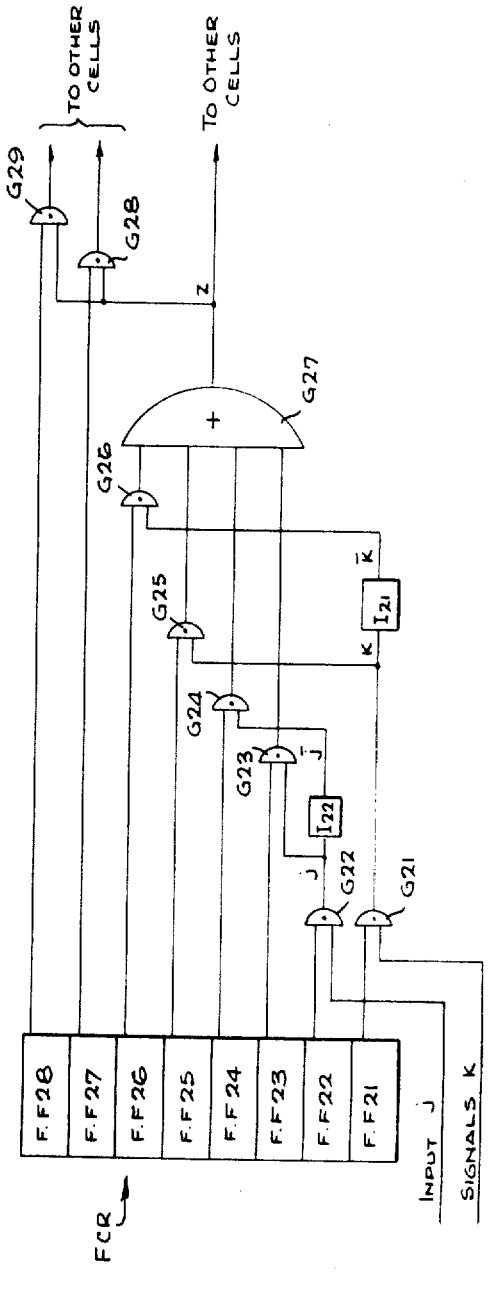

United States Patent Office 3,473,160
Patented Oct. 14, 1969

3,473,160
ELECTRONICALLY CONTROLLED MICROELECTRONIC CELLULAR LOGIC ARRAY
Sven Erik Wahlstrom, Palo Alto, Calif., assignor to Stanford Research Institute, Menlo Park, Calif., a corporation of California
Filed Oct. 10, 1966, Ser. No. 585,469
Int. Cl. G11b 13/00
U.S. Cl. 340—172.5
7 Claims

ABSTRACT OF THE DISCLOSURE

An electronically controlled logic cell, for use in a microelectronic cellular logic array, is disclosed. The cell includes a logic element having a plurality of input ports and a single output port. The cell includes a multistage shift register, each register stage being used to control the connection between either an input terminal of the cell and the logic element's input port, or between the output port of the element and one of the cell's output terminals. Each cell further includes a shift register control unit which is adapted to receive, simultaneously, two trains of pulses which are employed to serially set the register stages, each one of which assumes either a first stable state or a second opposite stable state of operation. The cells are connectable in an array including data busses and programming or control lines. By properly programming shift registers in selected cells, these cells, together with the data busses and control lines are used to route the trains of control pulses to any one of the cells in the array, to properly set the stages of the cell's shift register to assume the desired states.

---

This invention relates to logic circuitry and more particularly, to a microelectronic cellular logic array with electronic function controls.

Since the early development of digital equipment, and especially computers, the design trend has been away from hand wired special-purpose computers towards general-purpose machines, in which the sequence of operations is controlled by special-purpose programs. By programming the general-purpose computer it is made to operate as if it were a special-purpose machine.

In order to simplify the problem of maintaining computers in proper operating condition, such machines have been designed to include a minimum number of different types of logic elements, such as gates and flip-flops, to reduce the different types of spare parts which need be stocked for repair purposes. For example, some computers have been designed which consist of only simple NOR gates. The logic function performed by the computer depends on the way these NOR gates are interconnected.

Until recently, due to the relatively high cost of discrete logic elements, designers attempted to minimize the number of required elements at the expense of increased costs of interwiring or interconnecting the elements. However, recent advances in integrated circuit techniques have greatly reduced the cost of discrete elements. As these techniques have improved and the number of elements, constructable on a single chip have increased, the trend has been to develop element arrays in which some of the elements themselves are used to perform interconnecting or interwiring functions and thereby reduce the cost of manually wiring discrete components to one another. Such an array may be thought of as microelectronic cellular logic array, hereafter also referred to as an MCA.

Briefly, an MCA consists of a plurality of cells arranged in an array. Each cell has a plurality of input terminals and one or more output terminals, connected to other cells in the array. Each cell also includes at least one logic element, which is capable of performing any one of a plurality of logical subfunctions, depending on which of the input terminals are selectively connected thereto and the input signals at such input terminals. Also the output of the element is selectively coupled to any combination of neighboring cells, to which the output terminals are connected. The selection which of the terminals are connected to the logic elements is realizable by means of switchable arrangements.

In constructing a prior art MCA, all the logic elements of all the cells are deposited or formed on a single integrated circuit chip, with all the terminals in each cell being disconnected from the logic element therein. Then, depending on the particular logic function to be performed by the array, the array is customized by depositing the necessary connections in each cell to enable the cell to perform the necessary subfunction so that the resultant function of the array is the particular desired one. A large number of such arrays, each having its cells interconnected to perform a different selected complex function, may be used to comprise a relatively large general-purpose computer. Each array providing a specific function, by having the terminals in each cell fixedly connected to the logic element thereof, may be thought of as a special-purpose or customized array. The computer is then programmed to perform a sequence of operational steps on the fixed logic function outputs of the various customized arrays.

All or most of the arrays, prior to being selectively interconnected, may be standardized to be identical to one another, thereby increasing the production run which results in reduced cost per array. Only after the array is constructed, are the special interconnections within each cell deposited to fix the connections between the logic element and the input and output terminals, so that the cell performs the particular subfunction assigned thereto, as well as, being connected to adjacent cells. The deposition of each selected interconnection pattern may be accomplished by means of an optical mask, used to control the deposition of connections at desired locations in each cell. One mask is required for each different interconnection pattern. The cost of designing and fabricating each mask is quite high. Thus, when a large number of masks is required, the total cost of producing the customized arrays, each providing a unique selected function is high, even though the cost of each array prior to being fixedly interconnected may be relatively small. Another disadvantage of a cellular array with fixed interconnections is its customized characteristic which limits it to perform only the particular logic function assigned thereto. Thus, one or more spare arrays are needed for each type of customized array in the computer, thereby further increasing the over-all cost of computer maintenance.

It has been found that, if instead of interconnecting each cell in the array with fixed connections, and thereby permanently customizing the array, each of the cells is electronically controlled to perform a specific subfunction, the need for connection deposition masks may be eliminated, thus reducing the cost of array development and fabrication. Furthermore, if the electronic controlling of each cell is programmable, each of the cells in a standardized array may be selectively programmed, so that the same standardized array may provide any one of a plurality of logic functions. Thus, the number of different type arrays and the number of spare arrays, needed in a computer, may be reduced, thereby greatly reducing the cost and size of the computer. That is, by lowering the programming to the cell level, a smaller number of types of standardized arrays may be required. In such an arrangement the advantages realized by the capability of producing large numbers of standardized arrays, as well as reduction in spare parts, simplified maintenance are attained without sacrificing the unique functional output of each programmable array.

Accordingly, it is an object of the present invention to provide a new improved microelectronic cellular array.

Another object is to provide microelectronic cellular array, programmable to provide any one of a plurality of complex logic functions.

A further object is the provision of a new logic cell, usable in a microelectronic cellular array, with the cell being selectively programmable to provide any one of a plurality of subfunctions.

Still a further object is to provide a standardized microelectronic cellular array, programmable on the cell level to control each cell to provide a selected subfunction assigned thereto and thereby control the complex logic function, provided by the microelectronic cellular logic array.

Yet another object is to provide an improved microelectronic cellular array for use in digital equipment, which, due to the improved microelectronic cellular array requires a reduced number of spare arrays for proper maintenance.

Still a further object is the provision of a new microelectronic cellular array in which each cell is electronically programmable, to provide any one of a plurality of subfunctions, so that even when any of the cells fails the microelectronic cellular array may provide the complex function assigned thereto, by reprogramming the active cells in the array to provide new subfunctions, the combination of which results in the array's complex function.

These and other objects of the invention are achieved by providing a microelectronic cellular array in which each cell includes a plurality of input terminals, at least one output terminal and a logic element providing an output which is a function of one or more of the input terminals. The cell also includes a plurality of control elements. Their function is to control which of the input terminals is connected to the logic element, as well as which of the output terminals are connected to receive the output of the logic element. Each control element may consist of a flip-flop acting as a switch, which is electronically switchable between two stable states, assumed to define a binary "1" and a binary "0." By setting a flip-flop to a binary "1," the terminal associated with it is connected the logic element, while the terminal associated with a flip-flop in a binary "0" state is disconnected from the logic element. Thus, by controlling the states of the control elements in each cell, the connections between the input terminals and the element of the cell are controlled, thereby controlling the subfunction provided thereby. Also, by controlling the states of the control elements associated with the output terminals of each cell, the routing to other cells of the output of the cell, representing a desired subfunction, is controlled, thereby controlling the complex function provided by the array.

In order to minimize the number of leads or lines through which control signals are supplied to the control elements of such cell, the control elements in each cell are preferably arranged to form a serial input, parallel output multibit shift register, hereafter defined as a function control register (FCR). Cell programming is accomplished by providing sequences of binary program and clock signals to each FCR and shifting the control signals therethrough, until the required bit combination is stored therein. A plurality of FCR's may be interconnected in series to reduce the total number of control lines, necessary to supply the control signals to the FCR's. However, if any of the FCR's in the series fails subsequent FCR's become inaccessible for programming purpose. Therefore, in a preferred embodiment of the invention the control lines comprise of orthogonally aligned program lines, enabling the coincident selection of any of the FCR's in the array.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 4 is a chart summarizing the programming sequence of the FCR's;

FIGURE 6 is a diagram of waveforms, useful in explaining the programming of the FCR's by means of coincident control signals;

FIGURE 7 is a chart useful in explaining the operation of the circuit, shown in FIGURE 5; and FIGURE 8 is a block diagram of another embodiment of a cell in accordance with the teachings of the present invention.

Figure 1:
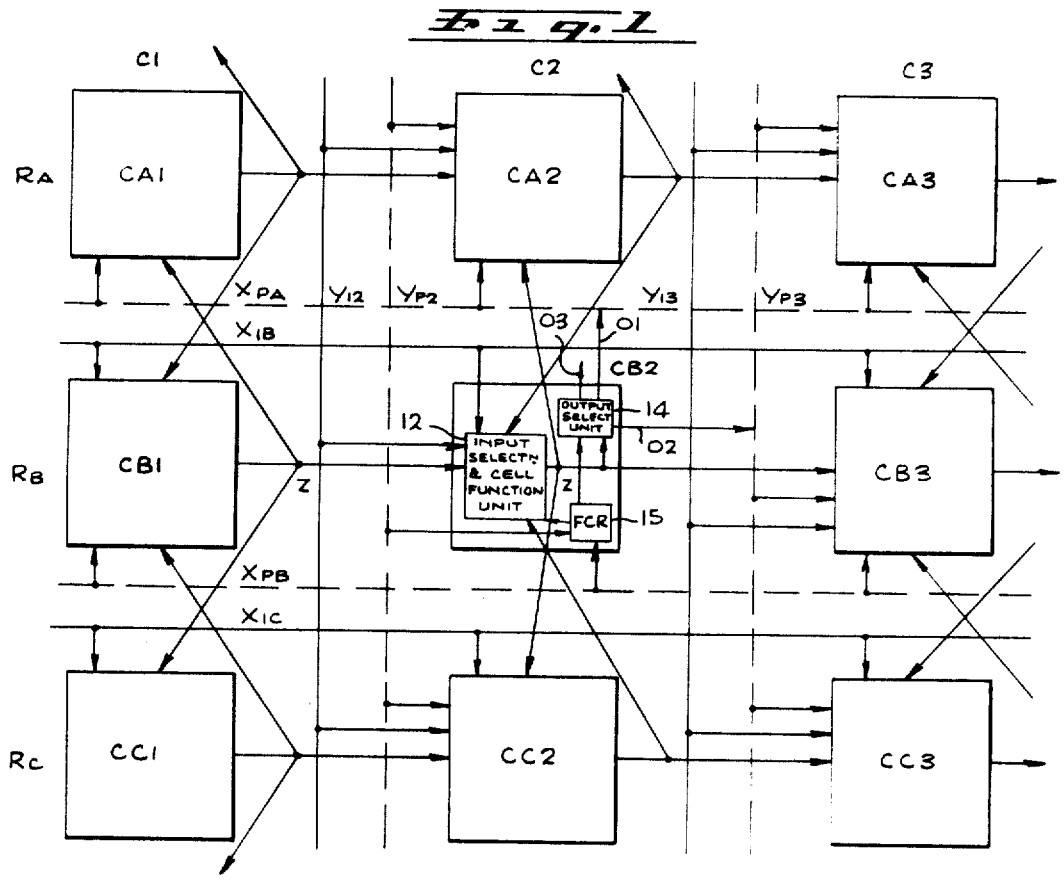
FIGURE 1 is a block diagram of one embodiment of a microelectronic cellular logic array of the present invention.

Reference is now made to FIGURE 1 which is a block diagram of one embodiment of a microelectronic cellular logic array (MCA) constructed in accordance with the teachings of the present invention. Therein, a plurality of cells are shown, arranged in an array of rows and columns designated $R_A$, $R_B$ and $R_C$ and C1, C2 and C3, respectively. Each of the cells is designated by the letter C followed by the letter and number, corresponding to the row and column thereof. Each of the cells is identical with cell CB2 shown including an input selection and cell function unit 12, an output selection unit 14 and a function control register (FCR) 15. A data bus or line designated $X_{1B}$ is associated with each element in row $R_B$, while another row data line $X_{1C}$ is associated with each of the cells in $R_C$. Similarly, a column data bus or line $Y_{12}$ is associated with all the cells in column C2 while a column data line $Y_{13}$ is associated with all the cells in column C3. In the foregoing designations, the first subscript numeral i.e. 1, indicates that the data line is a first of a plurality of lines, while the second subscript, such as B, C, 2 and 3 designate the respective row or column of cells associated therewith. Although in FIGURE 1, single row data lines and column data lines are shown associated with each cell, more than one row data line or column data line may be included in order to increase the number of data input lines, through which input signals may be supplied to each one of the cells.

In addition to the data lines, in FIGURE 1 row and column program lines are included. These lines are indicated by dashed lines designated $X_{PA}$ $X_{PB}$, $Y_{P2}$ and $Y_{P3}$, the P designating that programming pulses are supplied therethrough. Program line $X_{PA}$ is associated with the cells in row $R_A$, while program line $X_{PB}$ is associated with each of the cells in row $R_B$. Similarly, program line $Y_{P2}$ is associated with each of the cells in column C2, it being shown connected to FCR 15, while program line $Y_{P3}$ is associated with each of the function control registers in the cells in column C3.

Input selection and cell function unit 12 of cell CB2 has a plurality of input terminals and an output terminal, designated by letter Z. In FIGURE 1, data lines $X_{1B}$ and $Y_{12}$, associated with the cells in row $R_B$ and column C2 are connected to different input terminals of unit 12, while the output terminals Z of cells CB1, CA2 and CC2, are shown also connected to unit 12. The output terminal Z of unit 12 is shown directly connected to a succeeding cell CB3 in row $R_B$, as well as, to the output selection unit 14 and to cells CA2 and CC2 in column C2. Unit 14 is shown including a plurality of output terminals, limited for explanatory purposes to three, which are designated 01, 02 and 03. Output terminals 01 and 02 are shown connected to the program line $X_{PA}$, associated with the cells in row $R_A$ and to program line $Y_{P3}$, associated with cell CB3 in a succeeding column (C3).

As herebefore briefly explained, the function of the function control register 15, which is shown connected to units 12 and 14 is to control the connections between any of the input terminals to a logic element within unit 12, and thereby control the function output at output terminal Z. In addition, register 15 controls the output selection unit 14 and thereby controls what combination, if any, of output terminals 01, 02 and 03 is connected to the output terminal Z. Each of the output terminals 01, 02 and 03 may be connected to a data or program line, so that when a particular output terminal is connected to the output terminal Z, the particular line connected to the output terminal receives the output signal at output terminal Z. The controlling of the FCR 15 is accomplished by supplying it with programming pulses via the two program lines such as $X_{PB}$ and $Y_{P2}$ connected to its cell, so that the proper combinations of input and output terminals are connected to the cells logic element. Since the programming pulses in the program lines are used to control the FCR the program lines will hereafter also be referred to as control lines. For example, in the arrangement of FIGURE 1, FCR 15 of cell CB2 may be set so that unit 12 only responds to the output of cell CB1 supplied thereto, and the output of cell CB2 in addition to being supplied to the cell CB3 succeeding it in the same row, as well as to the cells CA2 and CC2 above and below it, is also supplied through output terminal 0 to the control line $X_{PA}$. When so controlled, cell CB2 routes the output of cell CB1 to any of the function control registers in the cells in row R.

The FCR 15 comprises a serial input, parallel output multibit shift register. By employing pulse time modulation discrimination techniques the time relationships, between row program pulses $X_P$ in row control line $X_{PB}$ and column program pulses $Y_P$ in column control line $Y_{P2}$, may be used to define binary "1's" and binary "0's" used to set each register bit which may consist of a flip-flop. The pulses $X_P$ and $Y_P$ are assumed to be supplied from a source of program pulses in a digital network computer of which the array forms a part.

The programming of the cells of the array is performed sequentially, by routing the row and column program pulses, via the proper row and column control associated with each FCR to set it in a desired state combination.

It is appreciated, that in such an arrangement, the total number of control lines, and therefore the total number of input terminals necessary at the periphery of the array is equal to the sum of the number of rows and columns in the array. The number of array terminals, necessary to be connected to control lines may be substantially reduced by connecting one output terminal such as 01 of the selection unit 14 in each cell to the row control line such as $X_P$ associated with the cells in a preceeding row, as well as by connecting an output terminal, such as 02 to the column control line associated with the elements in a succeeding column. This enables the routing of control or program pulses through some of the cells to control lines associated with neighboring cells, and thereby results in a reduction of the number of array terminals necessary to supply the array with the proper control pulses. Reduction of the number of required array terminals is most desirable since with present integrated circuit techniques a large number of cells may be deposited on a relatively small chip of a limited periphery. Thus, by reducing the number of terminals at the periphery, the construction is simplified.

Figure 2:
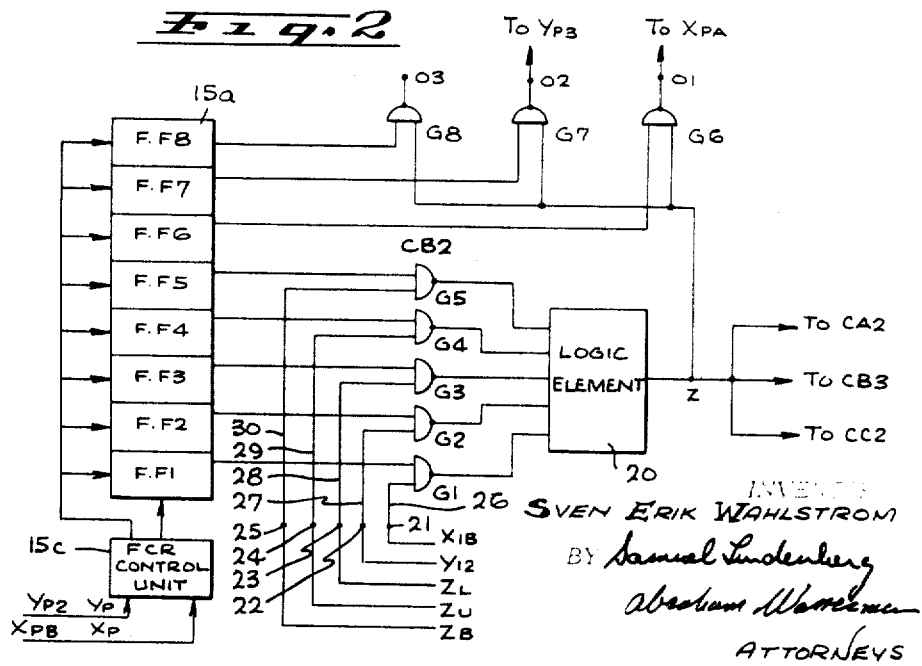
FIGURE 2 is a block diagram of one of the cells shown in FIGURE 1.

Reference is now made to FIGURE 2 which is a simplified block diagram of one embodiment of an array cell, such as cell CB2, shown in FIGURE 1. In FIGURE 2, the function control register 15 is shown comprising of a multibit shift register 15a, including flip-flops FF1 through FF8. The register is controlled by an FCR control unit 15c which responds to program pulses $X_P$ and $Y_P$ on control lines $X_{PB}$ and $Y_{P2}$ respectively, to set each of the register's flip-flops to either a binary "1" or a binary "0" state, depending on the time relationship between the program pulses, in a manner to be described hereafter. Each of the flip-flops has its output connected to one input terminal of a gate designated by the letter G and the flip-flop's numerical designation. Gates, G1 through G5 are shown having their outputs connected to a logic element 20, the output terminal of which, designated Z is shown connected to one input of each of gates G6, G7 and G8.

The function of gates G1–G5, assumed to form part of unit 12 (FIGURE 1), is to control the connections between the logic element 20 and the plurality of input terminals 21–25 respectively of cell CB2 and thereby control the input signals supplied to the logic element 20. In FIGURE 2, lines 26–30, connect one input terminal of each of gates G1–G5 to input terminals 21–25 respectively.

The 5 input lines to unit 12 (FIGURE 1) i.e. data line $X_{1B}$, data line $Y_{12}$, and $Z_L$, $Z_U$ and $Z_B$ connecting unit 12 to cells CB1, CA2 and CC2 respectively are shown connected to input terminals 21 through 25, respectively. Assuming that the gates in FIGURE 2 are NAND gates, it is appreciated that any of the gates, provided with a binary 1 from the flip-flop associated therewith, will provide a binary "1" output only when the other signal supplied thereto is a binary "0". Thus, by controlling the setting of flip-flops FF1 through FF5, the combination of input terminals coupled to logic element 20 and thereby the combination of input signals supplied to logic element 20 may be controlled.

Similarly, by controlling FF6–FF8, the combination of output terminals (01, 02 and 03) connected to the output terminal Z of logic element 20 may be controlled thereby controlling which of the lines or adjacent cells are supplied with the output of cell CB2. Following the arrangement shown in FIGURE 1, the output terminal Z of logic 20 in FIGURE 2 is shown fixedly connected to cell CB3 to the right of cell CB2, as well as to the cells above and below it. Relating, FIGURE 2 to the arrangement shown in FIGURE 1, gates G1–G5 as well as logic element 20 are assumed to comprise unit 12, while output selection unit 14 consists of gates G6–G8 with the shift register 15a and the FCR control unit 15c comprising the function control register 15, shown in FIGURE 1.

Figure 3:
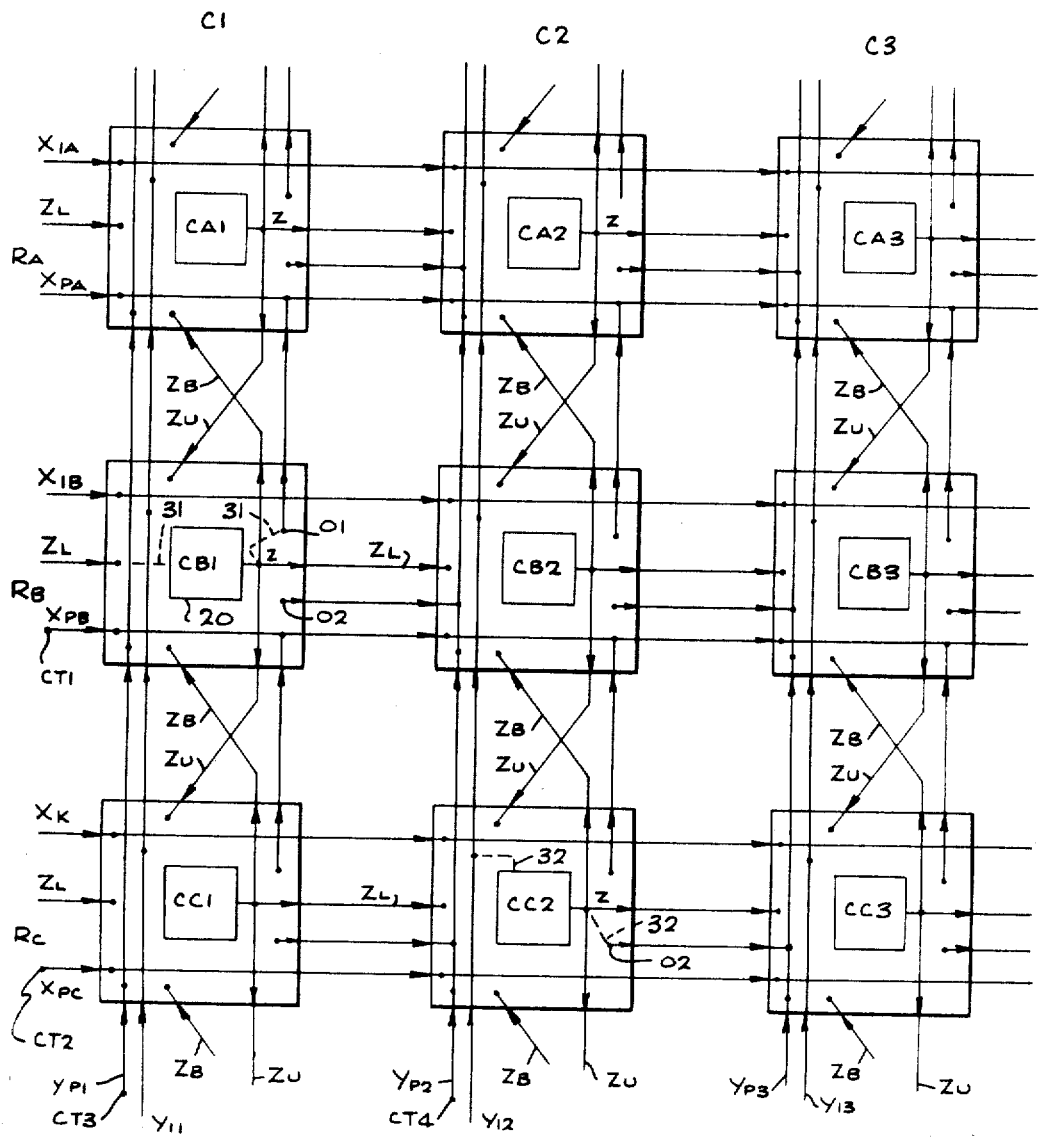
FIGURE 3 is a block diagram of another embodiment of a microelectronic cellular logic array, useful in explaining the programming of the FCR's of the various cells.

Reference is now made to FIGURE 3 which is a simplified array diagram, similar to that shown in FIGURE 1. FIGURE 3 is useful in explaining the use of cells for routing program pulses to control program lines associated with other cells, so that the number of array terminals necessary for function control register programming may be less than the total number of control lines within the array. In FIGURE 3, elements similar to those shown in FIGURES 1 and 2 are designated by like numerals. For explanatory purposes, it is assumed that the nine cells shown in FIGURE 3 comprise the lower left hand portion of a much larger array. Control or program lines $X_{PB}$, $X_{PC}$, $Y_{P1}$ and $Y_{P2}$ are shown connected to array control terminals designated CT1, CT2, CT3 and CT4, respectively. In operation, the first cell to be programmed is CB1. This is accomplished by supplying the proper program pulses to array control terminals CT1 and CT3, so that cell CB1 is controlled to connect its logic element 20 to the input terminal to which data line $Z_L$ is connected, as well as connect output terminal 01 to the output terminal Z of the logic element 20. Thus, any signal on data line $Z_L$ is supplied through the logic element 20 of CB1, to the output terminal 01, and therefrom to the control line $X_{PA}$, associated with the function control registers of each of the cells in row $R_A$.

After programming cell CB1, cell CC2 is programmed by supplying the proper program pulses to array control terminals CT2 and CT4 to operate cell CC2 in such a way, that pulses on data line $Y_{12}$ are supplied to logic element 20 thereof as well as interconnect the output terminal Z to output terminal 02, and thereby supply any pulses from data line $Y_{12}$ to the column control line $Y_{P3}$, associated with all the cells in the succeeding column C3. The connections in cells CB1 and CC2 are diagrammed in FIGURE 3 by dashed lines 31 and 32 respectively. Thereafter, cell CA3 is programmed by supplying the row program pulses ($X_P$) to input line $Z_L$ of cell CB1 and the column program pulses ($Y_P$) to data line $Y_{12}$. As a result, the pulses routed through cell CB1 are supplied to row control line $X_{PA}$, while the column program pulses are routed through cell CC2 to column control line $Y_{P3}$, thereby providing the coincident program pulses to cell CA3. As a result, each of the flip-flops therein is set to the desired state, to control the cell to provide any desired subfunction as a function of the input signals supplied thereto, as well as controlling the output terminals connected to the output of the logic element thereof. Subsequently, cell CB3 is programmed by supplying the row program pulses to array control terminal CT1, while the column program pulses for cell CB3 are supplied to data line $Y_{12}$ associated with cell CC2 which routes the column program pulses through the logic element thereof to the column control line $Y_{P3}$ associated with cell CB3.

Each of the other cells is similarly programmed by supplying row and column program pulses to the row and column control lines associated therewith, or by routing either the row program pulses and/or the column program pulses through cells CB1 and/or cell CC2. For example, cell CA2 is programmed by supplying the row program pulses to input line $Z_L$ associated with cell CB1 while the column program pulses for cell CA2 are supplied to array control terminal CT4.

The sequence of programming the nine cells of FIGURE 3, by using two of the cells (CB1 and CC2) to route row and column program pulses, is diagrammed in chart form in FIGURE 4, to which reference is made herein. Although only nine cells are programmed, the sequence of programming includes eleven steps since, initially cells CB1 and CC2 have to be programmed to route the program pulses therethrough. In FIGURE 4, the left hand column represents the program step while the next column designates the cell number being programmed. The next column designates the lines utilized to supply the program pulses to the function control register of the particular cell being programmed, while the right hand column, designated, "cell status after programming" indicates in the first two rows, the input line to which program pulses are supplied, as well as the output terminal through which the program pulses are supplied to an adjacent control line. In the other rows, a statement is made to indicate that the FCR of the particular cell is programmed so that the desired connections of the terminals to the logic element thereof are produced.

Summarizing the foregoing description, in accordance with the teachings of the present invention, a microelectronic cellular logic array is provided, wherein each cell includes a function control register, programmable to control the connections between a logic element within the cell and any combination of the cell's input and output terminals. By controlling the connections between the logic element and the input terminals, the input signals supplied to the logic element are controlled, and thereby the output function of the element is controllable. Also, by controlling the connections between the output of the logic element and the plurality of output terminals of the cell, the routing of the output of the cell to adjacent cells is controlled. Thus, a high degree of flexibility is provided by controlling the cells to provide desired subfunctions which, when combined, produce the desired complex function of the array.

Any one of the plurality of complex output functions may be provided by a single array by simply reprogramming the function control registers in the various cells and thereby altering the functional operation of each one of them. Thus, a standardized array may be operated as a customized array by controlling the programming of the function control registers thereof. Also, as hereinbefore described, by interconnecting several of the output terminals of each cell to control or program lines, associated with adjacent cells in adjacent rows and columns, the number of required array control terminals is minimized, which is most important when the array is constructable on a relatively small integrated circuit chip.

Figure 5:
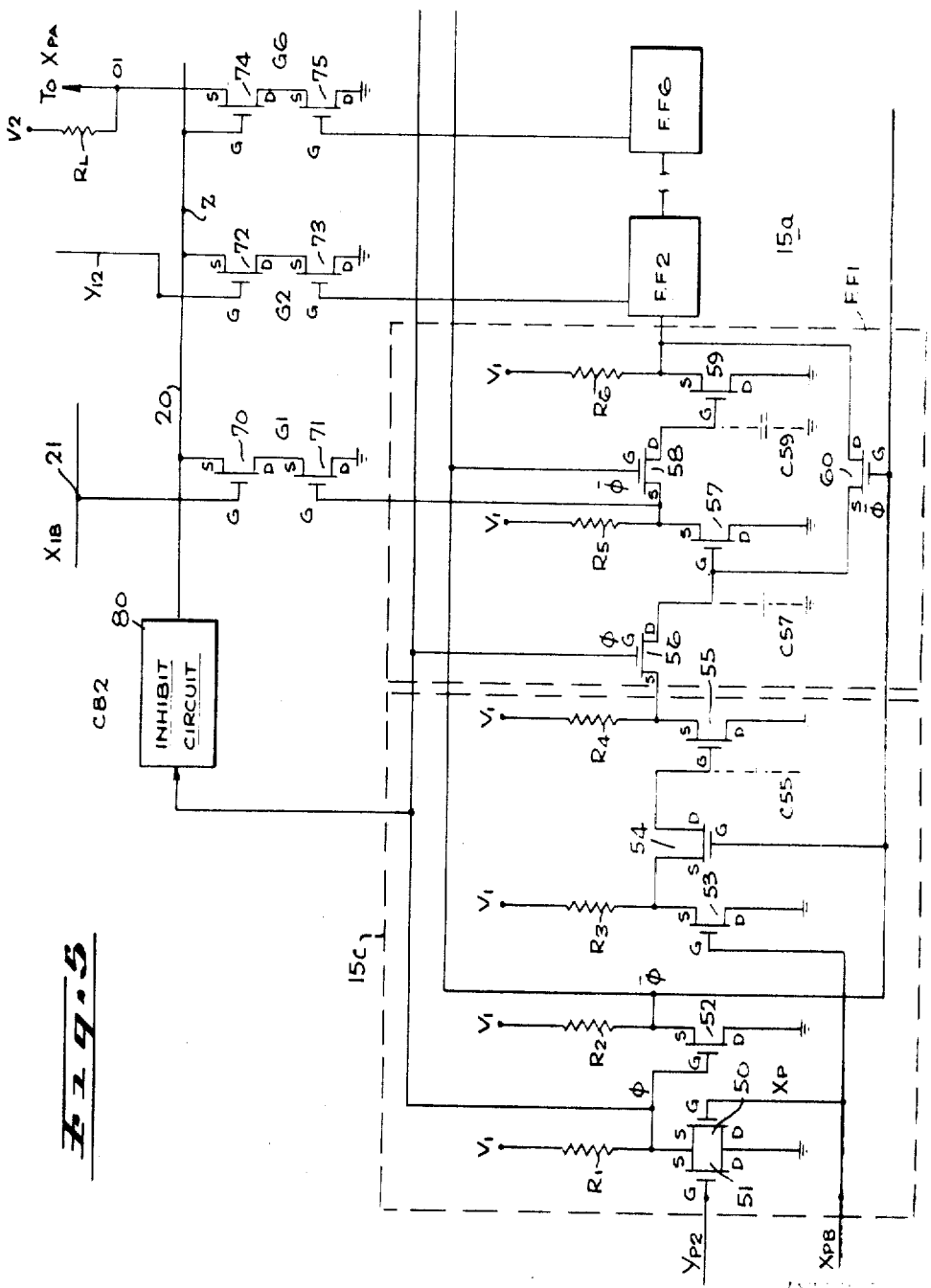
FIGURE 5 is a partial schematic diagram of the cell shown in FIGURE 2.

Although any one of presently known integrated circuit techniques may be employed to construct the multicell array on a single chip, a specific embodiment of some of the circuits or elements shown in FIGURE 2 is schematically diagrammed in FIGURE 5 to which reference is made herein. Therein the function control unit 15c (FIGURE 2), one of the flip-flops FF1 and three of the gates G1, G2 and G6 are schematically diagrammed. They are assumed to be formed by metal oxide silicone techniques known in the art by the acronym MOS cells. Such cells are extensively used in integrated circuits. To distinguish between the MOS cells and the cells of the array, herebefore referred to MOS cells will be referred to as MOS units, or simply units. FIGURE 5 is also useful in explaining the technique of pulse time modulation discrimination, used to set each of the flip-flops to either of its two stable states.

As is appreciated by those familiar with the art, each MOS unit is a three terminal junction with source (S) drain (D) and gate (G) terminals. In FIGURE 5, the FCR control units 15c is shown including MOS units 50 through 55 with the S terminals of 50 and 51 being connected to a potential reference terminal designated $V_1$ through a resistor R1. Similarly, the S terminals of MOS units 52, 53 and 55 are connected to reference potential $V_1$ through resistors R2, R3 and R4 respectively. The drain or D terminals of units 50 through 53 and 55 are connected to another reference potential such as ground, while the S terminal of 50 is connected to the G terminal of 52. The potential variations at the S terminals of MOS units 50 and 51 are used as clock pulses, designated $\phi$, while the complement of the clock pulses, designated $\overline{\phi}$ are provided by the potential variation at the S terminal of unit 52. Unit 54 has its S terminal connected to the S terminal of 53, while the D terminal is connected to the G terminal of 55, with the gate of 54 being connected to receive the complement clock pulses $\overline{\phi}$. In FIGURE 5 the gate to drain capacitance of unit 55 is designated by capacitor $C_{55}$, shown by the dashed lines.

In FIGURE 5, FF1, is shown including MOS units 56 through 60, with the gate terminal of 56 being supplied with clock pulses $\phi$ while the source S is connected to the source terminal of 55 and the drain terminal is connected to the G terminal of 57, whose drain terminal is connected to ground. The source terminals of MOS units 57 and 59 are connected to the reference potential $V_1$ through resistors R5 and R6, respectively, while the S terminal of 57 is connected to the S terminal of 58 whose G terminal is connected to receive the complement clock pulses $\overline{\phi}$. The D terminal of 58 is connected to the G terminal of 59, with the D terminal of 59 being connected to ground. Unit 60 has its S and D terminals respectively connected to G terminal of 57 and the S terminal of 59, while the G terminal of 60 is connected to receive the complement clock pulses $\overline{\phi}$. Also, the gate to drain capacitance of units 57 and 59 are designated by $C_{57}$ and $C_{59}$, represented by dashed lines.

The operation of the circuitry shown in FIGURE 5 may be best explained in conjunction with the waveforms, shown on lines a through d of FIGURE 6, to which reference is made herein. Lines a and b represent partial trains of row program pulses $X_P$ and column program pulses $Y_P$ respectively, supplied through row program line $X_{PB}$ and column program line $Y_{P2}$ to the gate terminals of units 50 and 51, respectively. For explanatory purposes, the $X_P$ pulses in line a are designated by numerals 80 and 81, while those on line b, representing $Y_P$ program pulses are designated by numerals 82 and 83. Line c represents the potential variations at the source terminal of MOS unit 50, representing the clock pulses $\phi$, while line d represents the potential variations at the source terminal of MOS unit 52, which is assumed to comprise the complement of the clock pulses, designated $\bar{\phi}$. The upper level of each waveform is assumed to represent a positive potential, represented by the (+) sign, while the lower level represents a lower potential indicated by the (−) sign.

Assuming that the reference potential $V_1$ (FIGURE 5) is a positive potential or plus, it is appreciated by those familar with the art, that by applying a positive potential to a gate terminal of a MOS unit, the gate is closed, so that the potential at the source terminal is substantially equal to that at the drain terminal. Thus, as seen from FIGURES 5 and 6, prior to a time $t1$, when both $X_P$ and $Y_p$ are plus (+), both gate terminals of 50 and 51 are at a plus (+) potential. Thus, both gates are closed, thereby drawing their source (S) terminals to substantially ground potential or minus, as indicated by the − sign in line c of FIGURE 6. On the other hand, when the G terminal of unit 52 is minus (−), the junction represented by 52 is open and therefore, the source terminal thereof, i.e. the complement of the clock pulses $\bar{\phi}$ is plus as indicated by the + level of line d (FIGURE 6), prior to time $t1$.

In operation, when flip-flop 1 (FIGURE 5) is in a binary "1" state, the source terminal of 57 is at a plus (+) potential. This is accomplished by supplying the control unit 15c with pulses 80 and 82 having a time relationship, whereby the beginning of the row program pulse 80 starts before the column program pulse 82. The leading edges of pulses 80 and 82 occur at times $t1$ and $t2$, respectively, as diagrammed in FIGURE 6. Both pulses terminate at a time $t3$. Program interval 1 starts at time $t1$, and terminates at time $t4$, while a succeeding program interval 2 during which pulses 81 and 83 are supplied to set FF1 to a binary "0" state, begins at time $t4$ and terminates at time $t8$. Pulse 83 starts at time $t5$ while pulse 81 starts at time $t6$ and both pulses terminates at time $t7$.

The potential levels at the various terminals of the MOS units 50 through 60 during various intervals between time $t1$ and $t8$ are diagrammed in chart form in FIGURE 7 to which reference is made herein. The plus (+) and minus (−) signs under each column represent the potential levels at the terminal designated at the head of the column. For example, 50G and 51G represent the gates (G) of units 50 and 51, respectively, etc. As seen in the third row under the column header 57S, representing the potential at the source (S) terminal of MOS unit 57, at the end of the first program interval 1, the potential at the source terminal is plus (+) representing a binary "1." On the other hand, at the end of program interval 2 between times $t7$ and $t8$ diagrammed in the last row, the sources (S) terminal of 57 is a minus (−), thereby representing that FF1 is set to a binary "0" state Each of the other flip-flops of register 15a includes an arrangement identical with that of FF1. An output terminal of flip-flop 1, represented by the source (S) terminal of 59 is connected to a source terminal of another MOS unit, such as 56 in a succeeding FF, to form the series of the FF's of register 15c.

MOS units are also utilized to form the gates such as G1 through G8 shown in FIGURE 2. Only three of the gates, G1, G2 and G6 are schematically diagrammed in FIGURE 5. Gate G1 which in FIGURE 2 is shown supplied with the output signal of flip-flop 1, as well as being connected to the data line $X_{1B}$ includes units 70 and 71, the gate (G) terminal of 70 being connected to data line $X_{1B}$ at input terminal 21, while the D terminal of 70 and the S terminal of 71 are interconnected. The D terminal of 71 is connected to ground, while the G terminal of 71 is connected to the S terminal of 57 in flip-flop 1. The S terminal of 70 is connected to a line 20 which in a sense represents the logic element 20 shown in FIGURE 2.

Briefly, when data line $X_{1B}$ is to be connected to logic element 20, FF1 must be set to a binary 1. Thus, the S terminal of 57 is plus (+) thereby closing the junction of MOS unit 71 which connects the S terminal thereof, as well as the D terminal 70 to substantially ground potential. Then, depending on the potential of the G terminal of 70, line 20 is either at a plus (+) or a minus (−) potential. When the G terminal of 70 is plus (+) i.e. the level of data line $X_{1B}$ is plus, the junction of 70 is also plus (+) thereby pulling the potential level of line 20 to a ground or minus (−) level. On the other hand, if flip-flop 1 is in a "0" state, i.e. the potential at G of 71 is minus (−), the junction of 71 is open, so that line 20 remains at a positive (+) potential, irrespective of the potential level at the G terminal of 70. Line 20 may be thought of as comprising of a NOR gate in that the potential level thereof is a plus (+) only when all the inputs connected thereto art at a minus (−) level.

Similarly, gate G2, shown in FIGURE 2 as controlling the connection between data bus $Y_{12}$ and the logic element 20 includes MOS units 72 and 73 with the G terminal of 73 connected to the source (S) terminal of 57 in flip-flop 2, while the G terminal of 72 is connected to the data line $Y_{12}$, via input terminal 22. The functional operation of logic element 20 as a function of only $X_{1B}$ and $Y_{12}$ may be defined by the following logic equation:

$$\overline{Z} = X_{1B} + Y_{12}$$

That is, the output at the Z terminal is a binary "1" or plus (+) only when both inputs are binary "0's" or minus (−) inputs. However, from FIGURE 2 it should be appreciated that element 20 is a NOR gate with five inputs, so that Z can be expressed as:

$$\overline{Z} = X_{1B} + Y_{12} + Z_L + Z_U + Z_B$$

where $Z_L$, $Z_U$ and $Z_B$ are inputs from cells CB1, CA2 and CC2 respectively.

In FIGURE 5 one of the output gates, such as G6 which controls the connection between output terminal 01 and the Z output terminal of logic element 20 is shown including MOS units 74 and 75. The G terminal of 75 is connected to the S terminal of a MOS unit 57 in FF6, while the G terminal of 74 is connected to the Z output terminal of logic element 20. Only when both G terminals of 74 and 75 are at plus (+) potentials is output terminal 01 at a negative or minus (−) potential, such as ground. However, if either of the G terminals is at a minus (−) potential, the junction of the MOS unit thereof is open, so that the output terminal 01 remains at a positive potential. In order to equally distribute the loading on the plurality of lines, connected to the input and output terminals of each cell, each of the lines at each terminal is preferably connected through a resistor such as $R_L$ to another reference potential such as $V_2$.

FIGURE 5 also includes an inhibit circuit 80 the function of which is to inhibit element 20, to maintain its output terminal Z at a minus (−) potential, during the time coincidence of the program pulses, such as 80 and 82 (FIGURE 6).

This is accomplished by supplying circuit 80 with the clock pulses $\phi$ which are plus (+) during such time coincidence such as for example during intervals $t2-t3$ and $t6-t7$ (FIGURE 6). When $\phi$ is plus (+), circuit 80 connects lines 20 and its output terminal to a minus (—) level, preventing it from becoming positive during the programming sequence.

It should be pointed out that all the flip-flops of the FCR are connected to the same reference potential $V_1$, which is preferably a separate source than $V_2$, used for the gates. This is most significant in attempting to preserve the settings of the flip-flops, and therefore the FCR even when the main potential source $V_2$ is turned off. Reference potential or source $V_1$ may be a small standby source sufficient to preserve the settings of the FCR's regardless whether main source $V_2$ is on or off. It should also be pointed out that the various resistors, shown in FIGURE 5, may be replaced by MOS units with positive gate bias. As is appreciated by those familiar with the art, the resistance between the source and drain terminals of a MOS unit is inversely proportional to the transconductance, which is a function of the unit's geometry or layout. Thus, by selecting the proper unit layout, the desired resistance thereacross may be formed.

In the foregoing, the invention has been described in conjunction with a single cellular array in which the cells are arranged in rows and columns. It should be appreciated however, that the teachings are not limited to one array. Rather, in a complex system the plurality of arrays may be stacked on top of one another with vertical buses intercoupling the arrays. These buses or lines may include program buses, as well as data buses, by means of which program pulses and cell or array outputs may be supplied from cells in one array to cells in the other arrays. Such a multiarray structure may be thought of as a module which may be connected to other modules in the system.

In FIGURE 2, the logic element assumed to be included in each cell, is represented by block 20, while in FIGURE 5 is designated as line 20, which is assumed to operate as a NOR gate. It should be appreciated that in practice, the logic element need not be limited to a NOR gate, but may be designed to perform any desired logic function. Also, the actual functional output of the logic element may be made a function of one or more of the flip-flops of the FCR associated therewith in addition to the signals from the input gates, such as G1–G5 (FIGURE 2). For example, each cell may comprise an arrangement such as the one diagrammed in FIGURE 8, in simplified form. FF21–FF28 represent the FCR, with FF21 controlling an input gate G21 supplied with an input signal $k$, and FF22 controlling an input gate G22 supplied with an input signal $j$. The logic element is assumed to comprise AND gates G23–G26 connected to FF23 through FF26, respectively, two inverters designated I21 and I22, and an OR gate G27, the output of which represents the cell output Z. Output gates G28 and G29 are controlled by FF27 and FF28, respectively. When FF21 and FF22 are in an ON state, enabling gates G21 and G22, the output Z may be expressed as:

$$Z = j(FF23) + \bar{j}(FF24) + k(FF25) + \bar{k}(FF26)$$

where $\bar{j}$ and $\bar{k}$ represent the complements of $j$ and $k$ respectively.

Thus, the cell output is a function of the input signals $j$ and $k$, as well as the states of FF23 through FF26 of the FCR.

It should further be pointed out that since the connections between the input and output terminals of each cell and the logic element thereof are controlled by the cell's FCR, a cell may be connected to operate as a flip-flop. For example, in a given cell, one of the input gates, such as G1 (FIGURE 2) and one of the output gates, such as G8, may be connected to the same data bus. By enabling the input and output gates by means of their associated flip-flops in the FCR a binary pulse on the data bus may be used to set the cell to provide either a binary "1" or a binary "0" output and thereby control the binary state of the data bus. Thus a cell may serve as a flip-flop to control a data bus connected thereto.

From the foregoing, it should be appreciated that by providing a programmable function control register (FCR) in each cell of the array to control the cell's operation, significant advantages flow therefrom. The basic advantage is the ability to vary the performance of each cell and thereby vary the functional operation thereof which results in the control of the array's functional performance. This enables the use of a single standardized array to provide functions of the type heretofore provided only by customized arrays. By reprogramming the FCR's a different array function may be provided. Also, in case of defective cells, by reprogramming the FCR's the defective cells may be by-passed and thereby salvage the array, rather than require its replacement.

The novel programmable array of the present invention may find application in any system where logic circuitry is incorporated. The ability to reorganize the array's performance may be most useful in on-line computer applications, where the speed of a general-purpose computer is insufficient. In such cases, a special-purpose computer is employed. Such a computer can perform only specific operations. However, by utilizing the teachings of the invention the general-purpose computer may be programmed to perform the functions as if it were a special-purpose computer, yet, be reprogrammable to perform other functions. The same array may be utilized to perform several special-purpose computer functions, provided enough time is allowed for reprogramming the array or arrays between the performance of specific functions.

There has accordingly been shown and described herein a novel cellular logic array, which is electronically programmable thereby providing a highly advantageous logic structure. It is appreciated, that those familiar with the art may make modifications in the arrangements shown and described as examplary of the invention without departing from the true spirit thereof. Therefore all such modifications and/or equivalents are deemed to fall within the scope of the appended claims.

What is claimed is:

1. In a cellular array of the type including a plurality of logic function producing cells for providing an array output signal representing a logic function of a selected combination of a plurality of input signals, said array including data busses, to which input signals are applied and each cell in said array including cell logic means for producing a selected output signal which is a selected function of input signals supplied thereto, terminals, including input terminals coupled to the data busses and output terminals at least one of which is connected to an adjacent cell, the improvement comprising:

a plurality of control elements in each cell, each control element having first and second stable states and associated with only one of the cell's terminals;

a plurality of gating means in each cell, each gating means having a first input line connected to one of said control elements, and a second input line connected to the cell's terminal with which the control element connected to the first input line is associated, each gating means having a single output line connected to an input line of said cell logic means for controlling the connection between the cell's terminal to which its second input line is connected, and the logic means as a function of a selected one of said first and second stable states of said control element connected to the first input line;

control means in each cell for selectively controlling the stable state of each control element in each cell to selectively control the connections between the cell's input terminals and the input lines of said cell logic means and the connections between the output line of said cell logic means and selected output terminals of said cell;

said plurality of control elements being interconnected to form a shift register connected to said control means, said array including control-line means coupled to the control means of each cell for supplying control pulses thereto to serially control the stable states of the control elements of the register connected thereto;

said cells being arranged in rows and columns and said control line means include a column control line for each column of cells and a row control line for each row of cells and the control means in each cell are coupled to the row and column control lines associated with the row and column respectively in which the cell is located, each of said row and column control lines having an end connected to a terminal at the periphery of said array for supplying said control means with first and second trains of control pulses separately applied to two different terminals of said row and column control lines at the periphery of said array to sequentially control the stable states of the control elements connected to said control means in cells at the periphery of said array as a function of the time relationships between corresponding pulses in said first and second trains of control pulses.

2. The improvement as recited in claim 1 wherein at least one output terminal of each cell is connected to either a row or a column control line coupled to the control means in a cell in an adjacent row or column.

3. The improvement as recited in claim 2 wherein one output terminal of each cell is connected to a row control line coupled to the control means of cells in an adjacent row said cell having another terminal connected to a column control line coupled to the control means of cells in an adjacent column whereby trains of control pulses are routable through each cell to adjacent cells.

4. A function array comprising:
a plurality of function cells arranged in an array of rows and columns, each cell including input terminals for receiving input binary signals, output terminals for supplying output binary signals and a logic element having a plurality of input ports and an output port for providing a binary functional output at said output port as a function of binary signals at the input ports thereof;
a plurality of row data lines, at least one row data line connected to one input terminal of each cell of a row of said array;
a plurality of column data lines, at least one column data line connected to one input terminal of each cell of a column of said array;
connecting means coupling at least one input terminal of each cell to the output terminal of an adjacent cell; and
cell control means in each cell for controlling the connections therein between the input terminals and the input ports of the logic elements and between the output port of the logic element and the output terminals thereof, said cell control means including a plurality of bistable elements and a plurality of control stages, each control stage including a gate associated with a terminal of said cell and a port of the logic element thereof and coupled to one of said bistable elements, whereby the connection between the terminal and the port associated with each gate is a function of the state of the bistable element associated therewith, and bistable element control means adapted to receive control pulses for sequentially controlling the states of said bistable elements;

the bistable elements in each cell being connected to form a serial input parallel output shift register having an input connected to the bistable element control means in the cell, said array further including a plurality of row control lines each row control line connected to the bistable element control means in each cell in a row of said array, and a plurality of column control lines, each column control line connected to the bistable element control means in each cell in a column of said array, selected ones of said row and column lines having input terminals at ends thereof exposed at the array periphery for receiving control pulses simultaneously supplied to two of said lines and for supplying said control pulses to the bistable element control means of one of said cells, said bistable element control means controlling the state of each bistable element of the cell thereof as a function of the control pulses simultaneously supplied thereto through the row control line and the column control line connected thereto.

5. The function array as recited in claim 4 wherein the control pulses supplied to each bistable element control means through the row and column control lines connected thereto comprise trains of row and column control pulses, a first time relationship between corresponding row and column control pulses defining a binary "1" and a second time relationship defining a binary "0" to control each bistable element of said shift register to be in either a binary "1" state of a binary "0" state.

6. The function array as recited in claim 5 wherein one output terminal of each cell is connected to the row control line associated with the cells in an adjacent row and another output terminal of each cell is connected to a column control line associated with cells in an adjacent column, whereby trains of row control pulses or column control pulses are routable through each cell to adjacent control lines.

7. The function array as recited in claim 6 wherein:
an output terminal of each cell is connected to the input terminals of an adjacent cell in the same row and to cells above and below it in the same column.

References Cited

UNITED STATES PATENTS

| 3,106,698 | 10/1963 | Unger | 340—172.5 |
| 3,159,818 | 12/1964 | Scantlin | 340—172.5 |
| 3,226,688 | 12/1965 | Amdahl et al. | 340—172.5 |
| 3,287,702 | 11/1966 | Borck et al. | 340—172.5 |
| 3,328,769 | 6/1967 | Lee | 340—172.5 |
| 3,331,055 | 7/1967 | Betz et al. | 340—172.5 |
| 3,366,931 | 1/1968 | Githens | 340—172.5 |

ROBERT G. BAILEY, Primary Examiner

H. E. SPRINGBORN, Assistant Examiner